(12) United States Patent
Lin et al.

(10) Patent No.: US 9,250,748 B2
(45) Date of Patent: Feb. 2, 2016

(54) PORTABLE ELECTRICAL INPUT DEVICE CAPABLE OF DOCKING AN ELECTRICAL COMMUNICATION DEVICE AND SYSTEM THEREOF

(71) Applicant: Cho-Yi Lin, New Taipei (TW)

(72) Inventors: Cho-Yi Lin, New Taipei (TW); Yu-Shuang Hua, Taipei (TW); Chia-Lei Tang, Taipei (TW)

(73) Assignee: Cho-Yi Lin, New Taipei (TW)

( * ) Notice: Subject to any disclaimer, the term of this patent is extended or adjusted under 35 U.S.C. 154(b) by 161 days.

(21) Appl. No.: 13/767,419

(22) Filed: Feb. 14, 2013

(65) Prior Publication Data

US 2014/0098025 A1 Apr. 10, 2014

(30) Foreign Application Priority Data

Oct. 9, 2012 (TW) .............................. 101137344 A

(51) Int. Cl.
*G06F 3/042* (2006.01)
*G06F 1/16* (2006.01)

(52) U.S. Cl.
CPC ............ *G06F 3/0426* (2013.01); *G06F 1/1632* (2013.01); *G06F 3/0428* (2013.01)

(58) Field of Classification Search
CPC ... G06F 3/0426; G06F 3/0428; G06F 3/0421; G06F 1/1632; G06F 3/016; G06F 3/017; H04M 1/06; H04M 1/0254; H04M 1/0272
USPC ...................... 345/156, 169, 173, 175; 710/2; 715/700; 348/77; 250/221, 252.1; 463/31
See application file for complete search history.

(56) References Cited

U.S. PATENT DOCUMENTS

| | | | |
|---|---|---|---|
| 6,480,187 B1 * | 11/2002 | Sano et al. ..................... | 345/175 |
| 6,512,838 B1 * | 1/2003 | Rafii ........................ | G01C 3/08 |
| | | | 348/E3.018 |
| 9,015,638 B2 * | 4/2015 | Kipman ................. | A63F 13/06 |
| | | | 345/156 |
| 9,122,311 B2 * | 9/2015 | Galor ....................... | G09G 5/34 |

(Continued)

FOREIGN PATENT DOCUMENTS

| | | |
|---|---|---|
| CN | 100410857 C | 8/2008 |
| CN | 101571776 A | 11/2009 |

(Continued)

OTHER PUBLICATIONS

First Office Action issued in Taiwanese Application No. 101137344; Sep. 11, 2014; Taiwan Intellectual Property Office; Taipei, Taiwan; English translation of the Search Report is submitted herewith.

*Primary Examiner* — Dwayne Bost
*Assistant Examiner* — Darlene M Ritchie
(74) *Attorney, Agent, or Firm* — Stevens & Showalter LLP

(57) ABSTRACT

A portable electrical input device capable of docking an electrical communication device is provided. The input device includes a docking base, image sensors, and a communication interface. The sensing regions of the image sensors define an operation region. An operation pattern is selectively configured in the operation region. The operation region is formed on an operation sheet or projected by an illuminating device. When an object operates in the operation region, the processor connected with the image sensors calculates a position information of the object according the sensed object image. The calculated position information is sent out through the communication interface.

14 Claims, 11 Drawing Sheets

(56) References Cited

U.S. PATENT DOCUMENTS

| | | | |
|---|---|---|---|
| 2003/0132921 A1* | 7/2003 | Torunoglu et al. | 345/173 |
| 2003/0132950 A1* | 7/2003 | Surucu et al. | 345/700 |
| 2003/0218760 A1* | 11/2003 | Tomasi et al. | 356/614 |
| 2003/0234346 A1* | 12/2003 | Kao | 250/221 |
| 2004/0046744 A1* | 3/2004 | Rafii et al. | 345/168 |
| 2005/0013103 A1* | 1/2005 | Chandley | G06F 1/1632 361/679.41 |
| 2005/0024324 A1* | 2/2005 | Tomasi et al. | 345/156 |
| 2007/0127205 A1* | 6/2007 | Kuo | G06F 1/1616 361/679.09 |
| 2007/0211023 A1* | 9/2007 | Boillot | 345/156 |
| 2008/0001078 A1* | 1/2008 | Pittel et al. | 250/252.1 |
| 2008/0018591 A1* | 1/2008 | Pittel et al. | 345/156 |
| 2009/0094384 A1* | 4/2009 | Tao et al. | 710/2 |
| 2010/0190548 A1 | 7/2010 | Motyl et al. | |
| 2010/0214267 A1* | 8/2010 | Radivojevic | G06F 1/1616 345/175 |
| 2010/0309155 A1* | 12/2010 | Lu et al. | 345/173 |
| 2011/0260976 A1* | 10/2011 | Larsen et al. | 345/168 |
| 2011/0267316 A1* | 11/2011 | Kim et al. | 345/175 |
| 2011/0285633 A1 | 11/2011 | Bathiche et al. | |
| 2011/0291991 A1* | 12/2011 | Lin | 345/175 |
| 2012/0032887 A1* | 2/2012 | Chiu et al. | 345/168 |
| 2012/0069169 A1* | 3/2012 | Dejima | 348/77 |
| 2012/0113008 A1* | 5/2012 | Makinen et al. | 345/168 |
| 2012/0229377 A1* | 9/2012 | Kim et al. | 345/157 |
| 2013/0088439 A1* | 4/2013 | Shih et al. | 345/173 |
| 2013/0135212 A1* | 5/2013 | Cheng et al. | 345/168 |
| 2013/0141393 A1* | 6/2013 | Chen et al. | 345/175 |
| 2013/0217491 A1* | 8/2013 | Hilbert et al. | 463/31 |
| 2013/0249802 A1* | 9/2013 | Yasutake | 345/168 |
| 2013/0249809 A1* | 9/2013 | Kawalkar et al. | 345/173 |
| 2014/0274309 A1* | 9/2014 | Nguyen | G07F 17/3202 463/25 |

FOREIGN PATENT DOCUMENTS

| | | |
|---|---|---|
| CN | 102520799 A | 6/2012 |
| TW | 201228334 A1 | 7/2012 |

\* cited by examiner

PORTABLE ELECTRICAL INPUT DEVICE CAPABLE OF DOCKING AN ELECTRICAL COMMUNICATION DEVICE AND SYSTEM THEREOF

CROSS-REFERENCE TO RELATED APPLICATIONS

This non-provisional application claims priority under 35 U.S.C. §119(a) on Patent Application No(s). 101137344 filed in Taiwan, R.O.C. on Oct. 9, 2012, the entire contents of which are hereby incorporated by reference.

BACKGROUND

1. Technical Field

The disclosure relates an input device, and more particularly to an input device equipped with a base carrier, having image sensors configured therein, for docking a portable electrical communication device.

2. Related Art

With the advancement of technology, as having the features of simple operation and convenient to carry, tablet PCs or smart phones has gradually replace the general notebook computers, which has become portable electronic products for users.

Tablet PCs or smart phones usually does not have a keyword input module, and use touch screen as basic input device. The touch screen allows the user to operation the system through a stylus or digital pen. The majority of the tablet PCs or smart phones support fingers operation to controlling, writing or zooming screen or patterns.

In addition to the stylus, the user can also operation the system though the built-in handwriting recognition, virtual keyboard on the screen, voice recognition or a real keyboard operation.

However, the typing speed for the virtual keyboards of tablet PCs or smart phones can not completely compete with the traditional keyboard. The touch screen input interface is not appropriate for long time operation. Therefore, many users still use the traditional keyboard as the input interface. Thus, an external input device for tablet PCs or smart phones is developed for the user to rapidly input text or instructions.

SUMMARY

The embodiment discloses a portable electrical input device for docking an electrical communication device. The disclosed input device comprises a base carrier used to carry the electrical communication device; a communication interface configured in the base carrier; a first image sensing assembly defining a first sensing region; a second image sensing assembly defining a second sensing region, wherein the first sensing region overlaps the second sensing region to define a touch region; an operation sheet having a function pattern, the operation sheet being configured in the touch region; and a processor electrically connected to the first sensing assembly, the second sensing assembly and the communication interface, which operates on the function pattern of the operation sheet in response to an image of an object, sensed by the first sensing assembly and the second sensing assembly, whereby position information of the object in the touch region is obtained by the computation performed by the processor and is sent to the electrical communication device through the communication interface.

The embodiment further discloses a portable electrical input device for docking an electrical communication device. The disclosed input device comprises a base carrier used to carry the electrical communication device; a communication interface configured in the base carrier; a first image sensing assembly defining a first sensing region; a second image sensing assembly defining a second sensing region, wherein the first sensing region overlaps the second sensing region to define a touch region; an light emitting device configured in the base carrier, projecting a function pattern on a working plane corresponding to the touch region; and a processor electrically connected to the first sensing assembly, the second sensing assembly and the communication interface, which operates on the function pattern projected on the working plane in response to an image of an object, sensed by the first sensing assembly and the second sensing assembly, whereby position information of the object in the touch region is obtained by the computation performed by the processor and is sent to the electrical communication device through the communication interface.

The embodiment also discloses a portable communication electrical system. The disclosed system comprises a base carrier; a communication interface configured in the base carrier; an operation sheet having a function pattern; and a portable communication electrical device, which is optionally carried by the base carrier, comprising: a first image sensing assembly defining a first sensing region; a second image sensing assembly defining a second sensing region, wherein the first sensing region overlaps the second sensing region to define a touch region, for the operation sheet being arranged therein; and a processor electrically connected to the first sensing assembly, the second sensing assembly and the communication interface, which operates on the function pattern of the operation sheet in response to an image of an object, sensed by the first sensing assembly and the second sensing assembly, whereby position information of the object in the touch region is obtained by the computation performed by the processor and is sent to the electrical communication device through the communication interface.

The embodiment also discloses a portable communication electrical system. The disclosed system comprises a base carrier; a communication interface configured in the base carrier; an light emitting device configured in the base carrier, projecting a function pattern on a working plane corresponding to a touch region; and a portable communication electrical device, which is optionally carried by the base carrier, comprising: a first image sensing assembly defining a first sensing region; a second image sensing assembly defining a second sensing region, wherein the first sensing region overlaps the second sensing region to define a touch region, for the operation sheet being arranged therein; and a processor electrically connected to the first sensing assembly, the second sensing assembly and the communication interface, which operates on the function pattern projected on the working plane in response to an image of an object, sensed by the first sensing assembly and the second sensing assembly, whereby position information of the object in the touch region is obtained by the computation performed by the processor and is sent to the electrical communication device through the communication interface.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
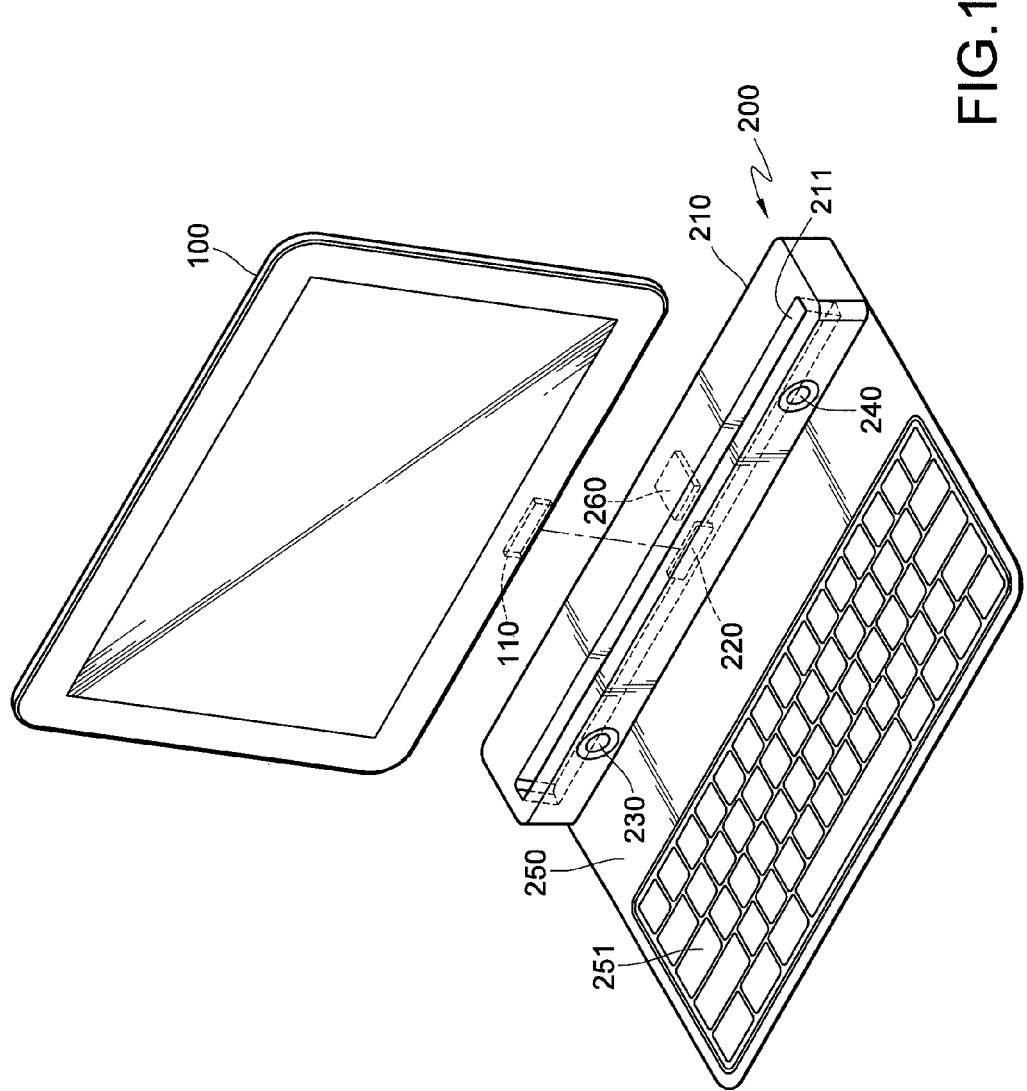
FIG. 1 and FIG. 2 illustrate the system diagram of a portable electrical input device for docking an electrical communication device according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The detailed characteristics and advantages of the disclosure are described in the following embodiments in details, the techniques of the disclosure can be easily understood and embodied by a person of average skill in the art, and the related objects and advantages of the disclosure can be easily understood by a person of average skill in the art by referring to the contents, the claims and the accompanying drawings disclosed in the specifications.

Figure 2:
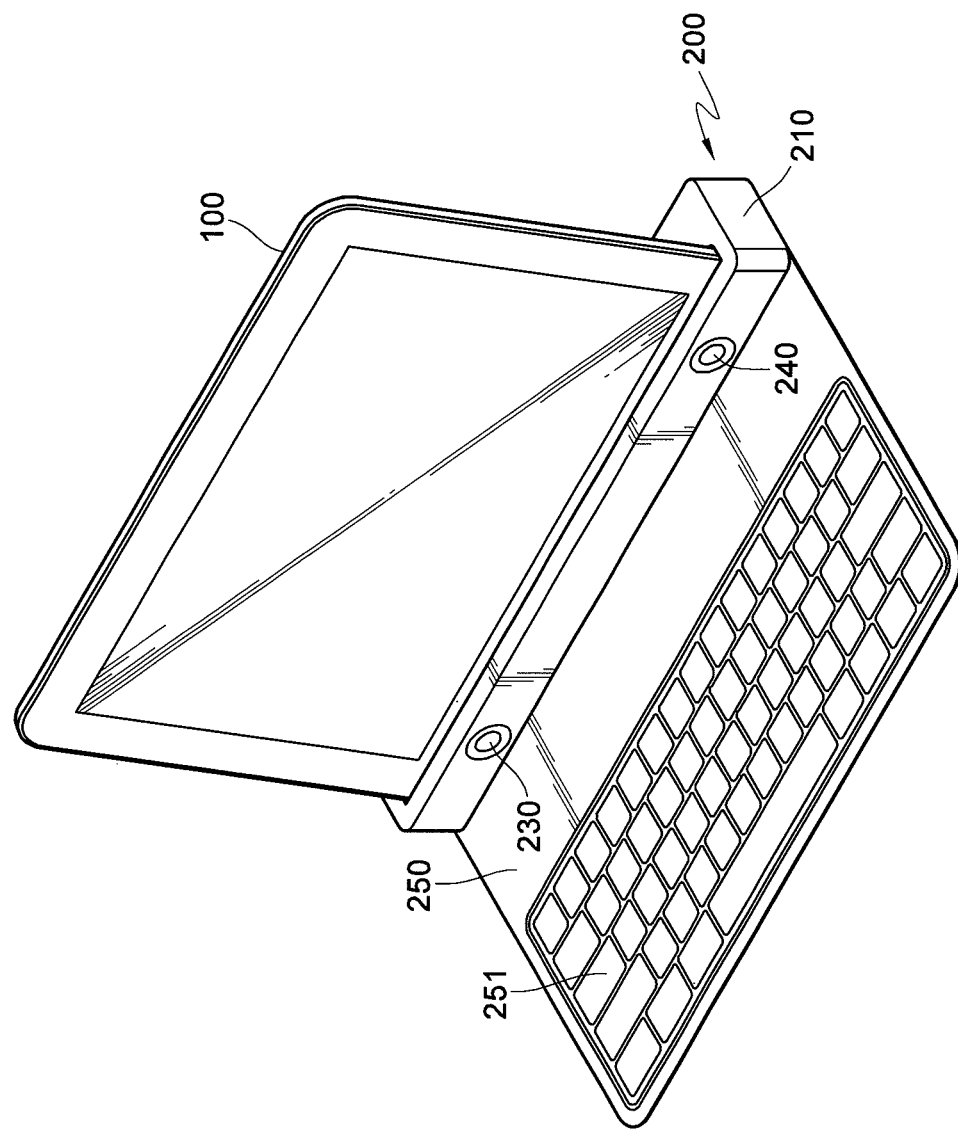

FIG. 1 and FIG. 2 illustrate the system diagram of a portable electrical input device for docking an electrical communication device of the disclosure. FIG. 1 illustrates the undocking status of the portable electrical input device and the electrical communication device of the disclosure. FIG. 2 illustrates the docking status of the portable electrical input device and the electrical communication device of the disclosure. The disclosed input device is applicable to the portable electrical communication 100, like tablet computers or intelligent mobile phones, in particular without an input device such as keyboard. The disclosed input device is applicable to portable electrical communication devices 100, like tablet computers or intelligent mobile phones, in particular without an input device such as keyboard. General computers or mobile phones may also use the input device of the disclosure for input.

The portable electrical input device 200 comprises a base carrier 210, a communication interface 220, a first image sensing assembly 230, a second image sensing assembly 240, an operation sheet 250 and a processor 260.

The base carrier 210 is designed to carry, accommodate or couple to the portable communication electrical device 100. Although the base carrier 210 in the figures is illustrated to have a groove 211 to steadily fix the portable communication electrical device 100, the groove 211 is only for illustration, and is not intended to limit the embodiment.

The communication interface 220 is configured in the base carrier 210. The communication interface 220 connects to and communicates with the communication interface 110 in the portable communication electrical device 100. The communication interface 220 and the communication interface 110 are wired communication interfaces, such as but not limited to Universal Series Bus (USB) 1.0, 1.1, 2.0 or 3.0 interfaces. In another embodiment, the communication interface 220 and the communication interface 110 may also be wireless communication interfaces, such as but not limited to Blue Tooth, Wireless Universal Series Bus (Wireless USB) or Ultra Wide Band (UWB). Moreover, communication interface 220 and the communication interface 110 may also adopt various wired or wireless communication interfaces.

The first image sensing assembly 230 and the second image sensing assembly 240 are configured in the base carrier 210. The first image sensing assembly 230 defines a first sensing region. The second image sensing assembly 240 defines a second sensing region. The first sensing region overlaps the second sensing region to define a touch region. Although it is not shown in the drawings, the base carrier 210 is formed to have a first transparent region in a portion corresponding to the first sensing assembly 230, and a second transparent region in a portion corresponding to the second image sensing assembly 240 such that the first image sensing assembly 230 and the second image sensing assembly 240 may sense an image of an object through the first transparent region and the second transparent region.

The portable electrical input device 200 further comprises an operation sheet 250 configured in the touch region. A function pattern 251 is arranged on the operation sheet 250 to virtually simulate a user input interface for an object operating thereon. The object is generally user's fingers or stylus pens. In one embodiment, the function pattern 251 is formed on the operation sheet 250 by way of printing. In another embodiment, the function pattern 251 may be formed on an adhesive sheet, and then is attached to the operation sheet 250 by way of sticking. The implementations of the function pattern 251 are not limited to these two embodiments. In the embodiment of the drawing, the function pattern 251 may be a QWERTY keyboard. The operation sheet 250 is disposed in the touch region (as the touch region 590 shown in FIG. 6). The operation sheet 250 may be designed to connect to the base carrier 210 or be separable from the base carrier 210. In another embodiment, the function pattern 251 may be different keyboard arrangement other than QWERTY arrangement. In another embodiment, the function pattern 251 may be a mouse, a number keyboard, a touch pad or a switch.

The processor 260 is configured in the base carrier 210 and electrically connected to the first sensing assembly 230, the second sensing assembly 240 and the communication interface 220. When the object operates on function pattern 251 on the operation sheet 250, the processor 260 computes a position information of the object according to the image of the object sensed by the first sensing assembly 230 and the second sensing assembly 240. The position information is sent to the portable electrical communication device 100 through the communication interface 110.

Figure 3:
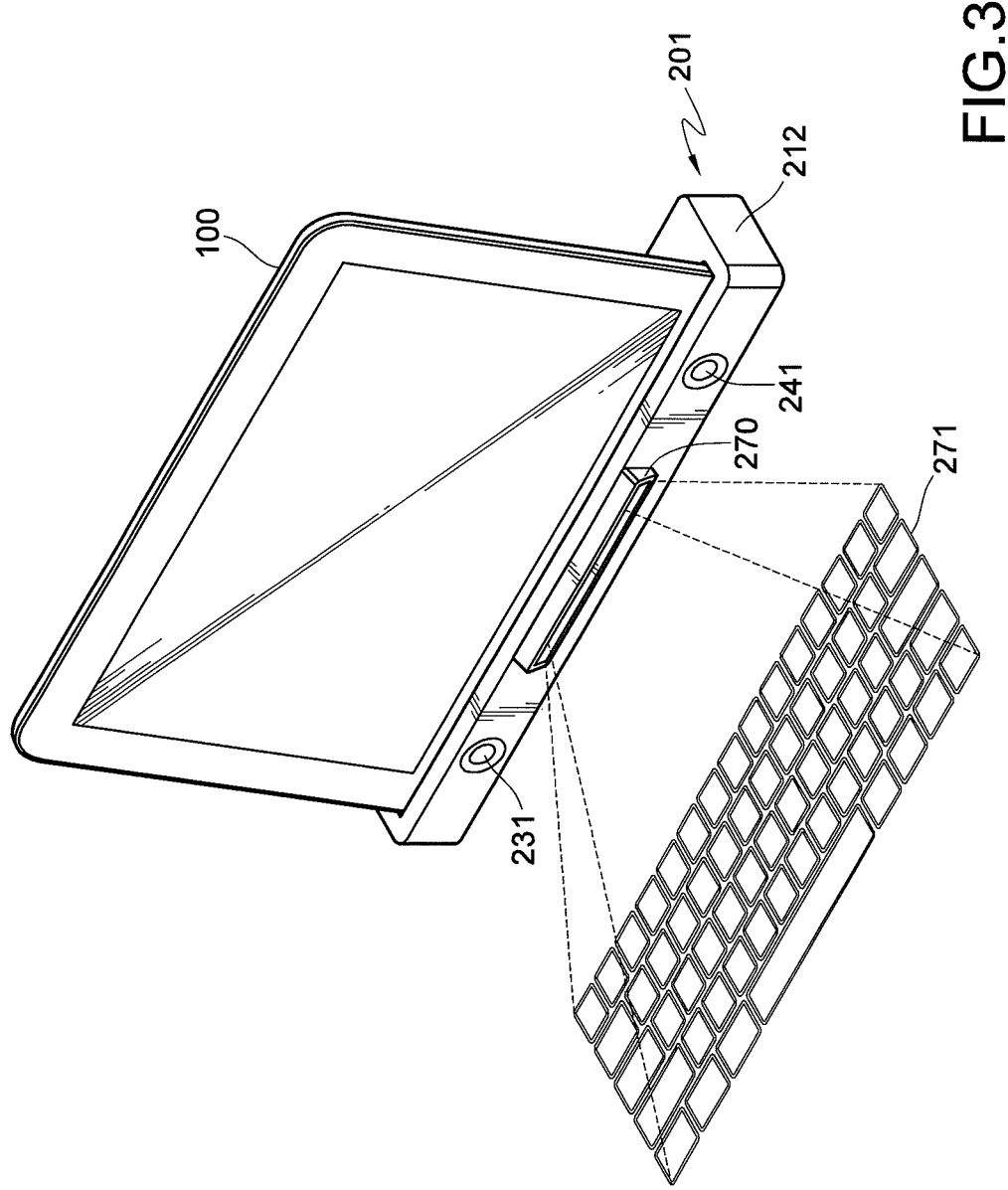
FIG. 3 illustrates the system diagram of a portable electrical input device for docking an electrical communication device according to another embodiment of the disclosure.

FIG. 3 illustrates the system diagram of a portable electrical input device for docking an electrical communication device according to another embodiment of the disclosure. The portable electrical input device 201 comprises a base carrier 212, a communication interface, a first image sensing assembly 231, a second image sensing assembly 241, a light emitting device 270 and a processor (not shown). The communication interface of this embodiment is similar to that in the afore-mentioned embodiment. The portable communication electrical device 100 is docked in the portable electrical input device 201 thus the communication interface is not shown in the drawing.

The operation and function of the base carrier 212, the communication interface, the first image sensing assembly 231, and the second image sensing assembly 241 are similar to those in the afore-mentioned embodiment, and thus are not illustrated hereinafter.

The light emitting device 270 is configured in the base carrier 212. The light emitting device 270 projects a function pattern 271 on a working plane corresponding to the touch region. The light source of the light emitting device 270 may be a laser light t source or visible Infra-red light t source. The processor is electrically connected to the first sensing assembly 231, the second sensing assembly 241 and the communication interface 220. In this embodiment, when the object operates on function pattern 271 on the working plane, the processor computes a position information of the object according to the image of the object sensed by the first sensing assembly 231 and the second sensing assembly 241. The position information is sent to the portable electrical communication device 100 through the communication interface 110.

Figure 4:
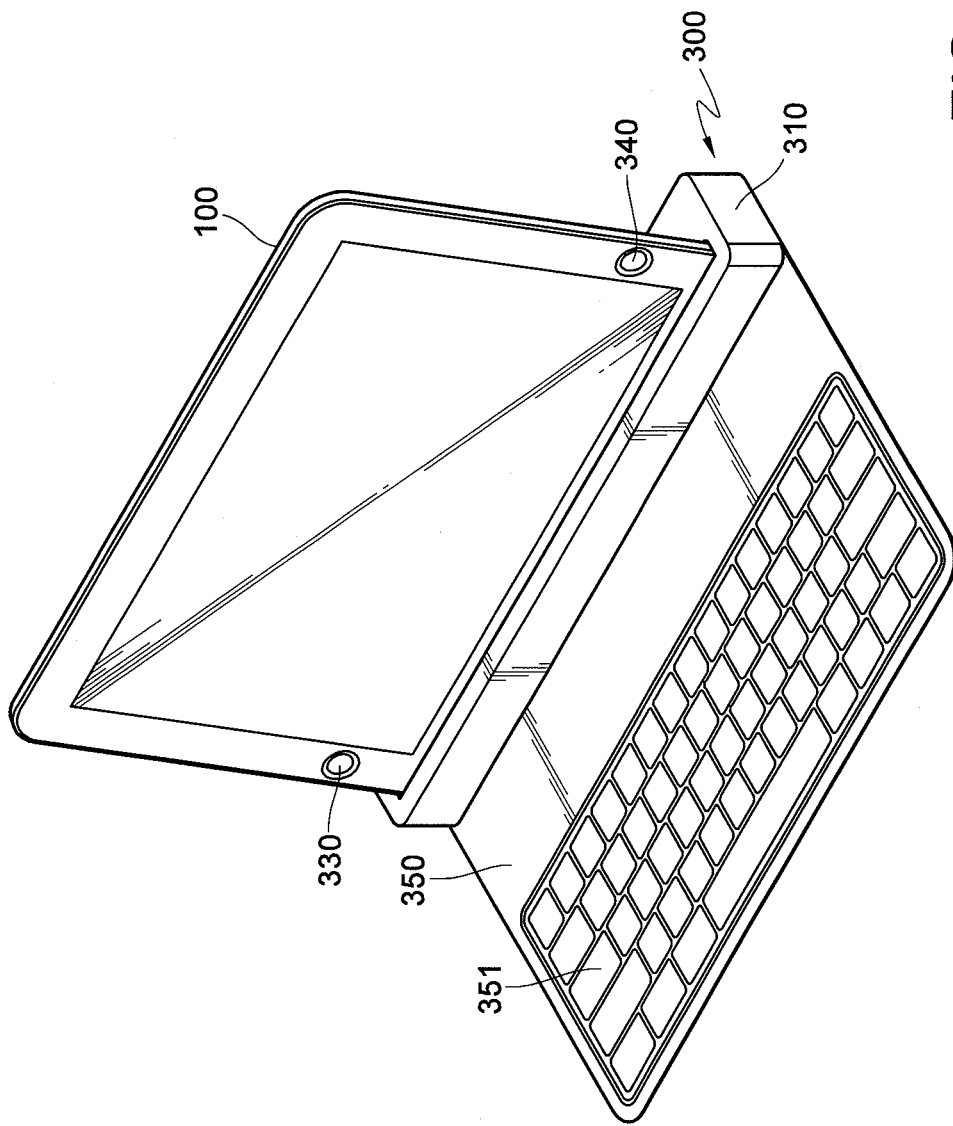
FIG. 4 illustrates the system diagram of a portable electrical input device for docking an electrical communication device according to another embodiment of the disclosure.

FIG. 4 illustrates the system diagram of a portable electrical input device for docking an electrical communication device according to another embodiment of the disclosure.

The portable electrical input device 300 comprises a base carrier 310, a communication interface (not shown), a first image sensing assembly 330, a second image sensing assembly 340, an operation sheet 350 and a processor (not shown). The processor in this embodiment is similar to that in the above embodiment and is not shown in the figure as the portable electrical communication 100 has docket on the portable electrical input device 300. The operation sheet has a function pattern 351. Besides the first image sensing assembly 330 and the second image sensing assembly 340, most of the components are similar as those in the aforementioned embodiments and details are not repeated again. It is appreciated from the figure that the first image sensing assembly 330 and the second image sensing assembly 340 are configured in the portable electrical communication 100.

Figure 5:
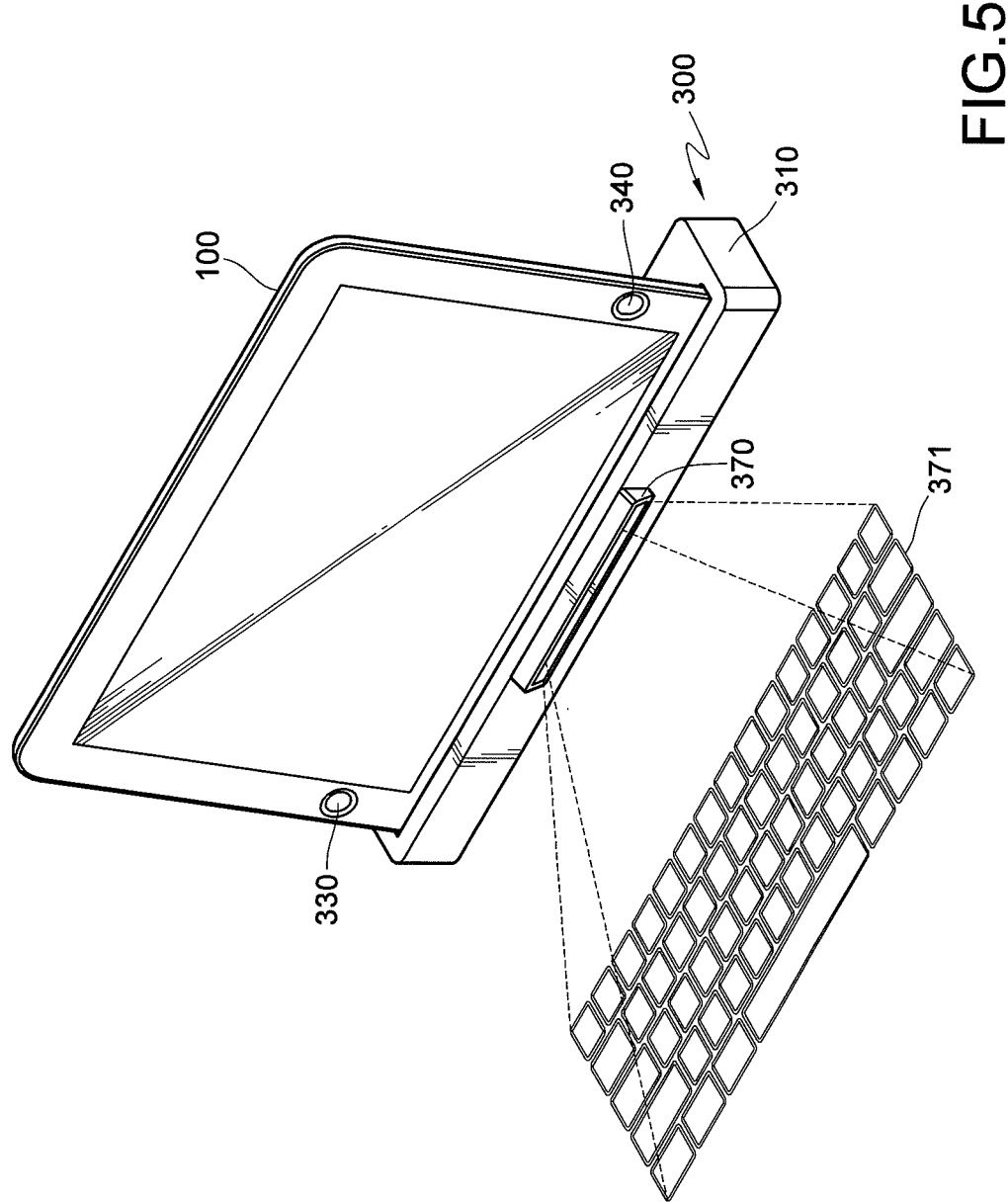
FIG. 5 illustrates the system diagram of a portable electrical input device for docking an electrical communication device according to another embodiment of the disclosure.

FIG. 5 illustrates the system diagram of a portable electrical input device for docking an electrical communication device according to another embodiment of the disclosure. Most of the components are similar as those in the embodiment of FIG. 4. In this embodiment, a light emitting device 370 is adopted to project the function pattern 371. The light emitting device 370 may be a visible laser light source or visible IR light source.

In the aforementioned embodiments, the processor in the portable electrical input device generates a control signal after the position information of the object is calculated. Therefore, in one embodiment, a vibrating element is configured in the base carrier to vibrate in response to the control signal. In another embodiment, a sounding element is configured in the base carrier to sound in response to the control signal. In other words, by the implementation of the vibrating element or the sounding element, the base carrier may vibrate or sound when the object operates on the operation sheet such that the user may experience as a real keyboard.

To avoid improper vibration or sound, the processor 260 may generate a determination signal in response to the image of the object sensed by the first sensing assembly and the second sensing assembly. The determination signal indicates whether the object is in the touch region. When the determination signal indicates the object is in the touch region, the processor generates the control signal. When the object is not in the touch region, the processor does not generate the control signal.

The details of the composition of the image sensing assembly and image sensing method are given below. The contents below are for illustration only and it is not intended to limit the embodiments of the image sensing assembly and image sensing method. Any other similar image sensing assembly or image sensing method may be applicable to the portable electrical input device of the disclosure. Further, for the convenience of description, the following description uses the embodiment of FIG. 1 for illustration. FIG. 2 and FIG. 5 are also applicable.

Figure 6:
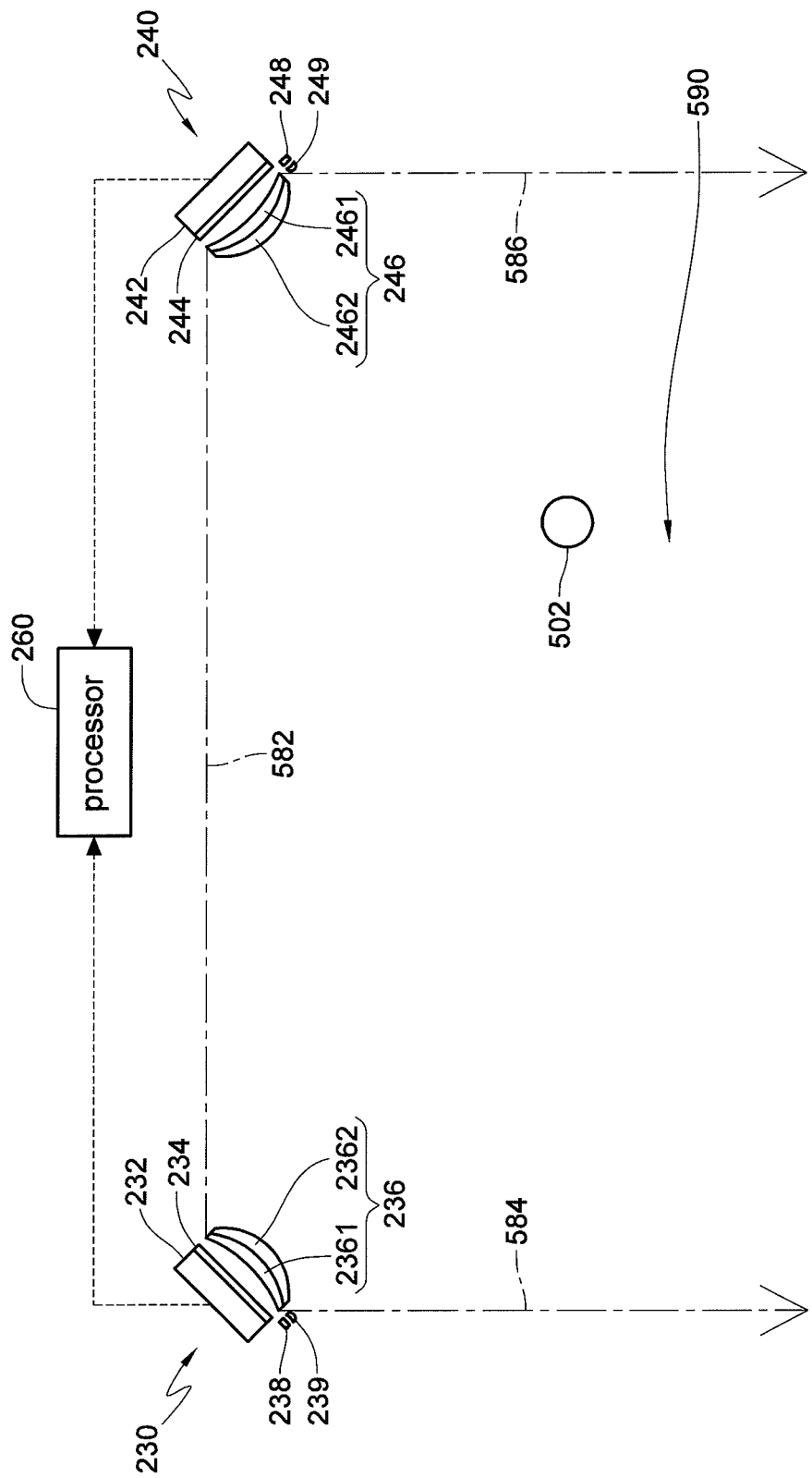
FIG. 6 illustrates a portable electrical input device for docking an electrical communication device according to another embodiment of the disclosure.
Figure 7:
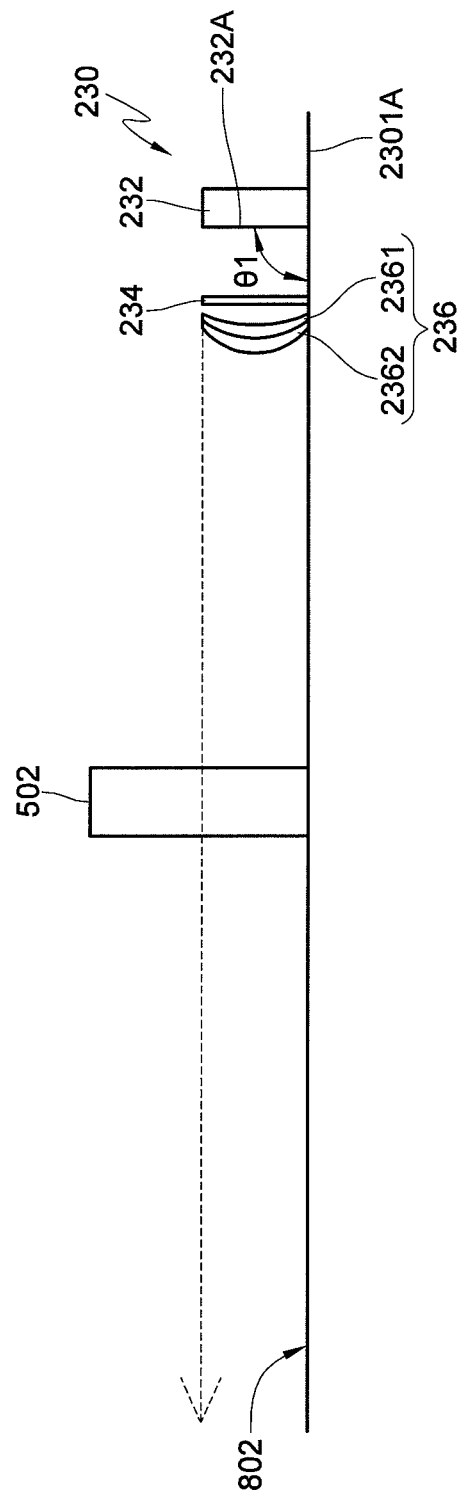
FIG. 7 illustrates a portable electrical input device for docking an electrical communication device according to another embodiment of the disclosure.

Refer to FIG. 6 and FIG. 7. FIG. 6 illustrates the portable electrical input device. FIG. 7 illustrates the first image sensing assembly 230. A numerical reference 502 represents an object, such as the finger of a user or a pen-like object. In this embodiment, the first image sensing assembly 230 further includes an first image sensor 232, an infrared (IR) filter 234 allowing only IR light to pass through, an optical lens set 236 composed of optical lenses 2361 and 2362, an IR emitter 238 and an optical lens 239; wherein the first image sensor 232 may be a charge-coupled device (CCD) or a CMOS image sensor. The type of the first image sensor 232 may be an array type or a linear type image sensor. In addition, in this embodiment a field of view of the first image sensor 232 maybe about 30 to 45 degrees and the first image sensing assembly 230 adopts the optical lens set 236 to broaden the field of view of the first image sensor 232 to at least 90 degrees such that a sensing area of the first image sensing assembly 230 may cover at least the area within an included angle between dotted lines 582 and 584. In the optical lens set 236, each optical lens may increase at least 30 degrees field of view of the first image sensor 232. Although the embodiment adopts optical lenses 2361 and 2362, the number of the lens may be changed according to the characteristics of the first image sensor 232. Thus, it is not limited to use two sets of lenses.

As for the IR emitter 238, the IR light emitted thereby illuminates the object 502 and an area covered within the included angle between the dotted lines 582 and 584 sequentially through the optical lens 239 and transparent part such that the first image sensing assembly 232 may acquire the image of the object 502 reflecting the IR light sequentially through the IR filter 234, optical lens set 236 and transparent part. That is, a shape and a size of the transparent part have to be designed to allow the first image sensing assembly 232 to be able to acquire the image of the area covered within the included angle between the dotted lines 582 and 584, and the transparent part should not block the propagation of the IR light emitted from the IR emitter 238 and passing through the optical lens 239 and should allow the IR light to illuminate all places inside the area covered within the included angle mentioned above.

Similarly, the second image sensing assembly 240 second image sensing assembly 240 further includes a second image sensor 242, an IR filter 244 allowing only IR light to pass through, an optical lens set 246 composed of optical lenses 2461 and 2462, an IR emitter 248 and an optical lens 249. In this embodiment, a field of view of the second image sensor 242 may be about 30 to 45 degrees and the second image sensing assembly 240 second image sensing assembly 240 adopts the optical lens set 246 to broaden the field of view of the second image sensor 242 to at least 90 degrees such that a sensing area of the second image sensing assembly 240 second image sensing assembly 240 may cover at least the area within an included angle between dotted lines 582 and 586. In the optical lens set 246, each optical lens may increase at least 30 degrees field of view of the second image sensor 242. Although the embodiment adopts optical lenses 2461 and 2462, the number of the lens may be changed according to the characteristics of the second image sensor 242. Thus, it is not limited to use two sets of lens.

As for the IR emitter 248, the IR light emitted thereby illuminates the object 502 and an area covered within the included angle between the dotted lines 582 and 586 sequentially through the optical lens 249 and transparent part such that the second image sensor 242 may acquire the image of the object 502 reflecting the IR light sequentially through the IR filter 244, optical lens set 246 and transparent part. That is, a shape and a size of the transparent part have to be designed to allow the second image sensor 242 to be able to acquire the image of the area covered within the included angle between the dotted lines 582 and 586, and the transparent part should not block the propagation of the IR light emitted from the IR emitter 248 and passing through the optical lens 249 and should allow the IR light to illuminate all places inside the area covered within the included angle mentioned above.

It should be mentioned that in an actual design, the aforementioned IR emitters may be implemented by using at least one IR light emitting diode (LED), and the aforementioned IR filters may be implemented by using an IR-pass filter. The wavelength of the IR light emitted by the IR LED may be about 800 nm to 960 nm, and generally the IR LED emitting the IR light of about 850 nm wavelength is used. In addition, as the field of view of an image sensing is generally 30 to 45 degrees, a number of the optical lenses adopted in the optical lens sets may be properly designed according to the field of view of the image sensing and the field of view that one optical lens can increase.

In another embodiment, at least one aforementioned optical lens in every aforementioned optical lens set is alternatively coated with a plurality of MgO layers and a plurality of $TiO_2$ or $SiO_2$ layers such that the at least one optical lens can have the function of an IR filter. Accordingly, the original IR filter may not be implemented in this embodiment. It should be mentioned that, the original IR filter refers to so called photo resistor and the material thereof includes organic compound, polymer and plastic.

In another embodiment, each IR emitter may be replaced by a laser emitting device and every IR filter may not be implemented. In addition, each optical lens in every optical lens set may not be coated with the MgO, $TiO_2$ and $SiO_2$ layers. It should be noted that, each optical lens disposed in front of the laser emitting device has to be able to convert a point light source emitted by the associated laser emitting device to a linear light source to have the laser light emitted by the associated laser emitting device be able to cover at least the touch region. In this manner, the laser light emitted by every laser emitting device may illuminate the object inside the touch region, and every image sensor is able to acquire the image of the object reflecting the laser light. It should be mentioned that, each laser emitting device may be implemented by using at least one laser diode.

In addition, the surface of the object 502 mentioned above may be coated with reflecting material to increase the reflection efficiency thereof.

In another embodiment, if the object to be detected can illuminate by itself, e.g. emitting IR light or laser light, the aforementioned portable optical touch systems may not adopt an IR emitter or a laser emitting device to illuminate the object. Of course, the optical lens disposed in front of the IR emitter or laser emitting device and other associated components may not be implemented.

It is known from the above description that the included angle between the dotted lines 582 and 584 is about 90 degrees and that between the dotted lines 582 and 586 is also about 90 degrees. Therefore, the dotted lines 582 and 584 define the sensing region of the first image sensing assembly 230 and the dotted lines 582 and 586 define the second image sensing assembly 240. The sensing region of the first image sensing assembly 230 and the sensing region of the second image sensing assembly 240 are partially overlapped and the partially overlapped sensing region is used to define a touch region 590. In addition, it is known from FIG. 6 and the above description that the first image sensor 232 is disposed substantially at an intersection of the dotted lines 582 and 584 while the second image sensor 242 is disposed substantially at an intersection of the dotted lines 582 and 586. That is, the first image sensor 232 and the second image sensor 242 are respectively disposed at two different corners of the touch region 590.

FIG. 7 shows a side perspective view of the first image sensing assembly 230. A numerical reference 802 refers to an actual working surface. As shown in FIG. 7, there is a predetermined included angle $\theta 1$ between an image sensing surface 232A of the first image sensor 232 and a bottom surface 2301A of the base carrier, and the predetermined included angle $\theta 1$ is 90 degrees in this embodiment. In addition, the IR filter 234, optical lens set 236, IR emitter 238 (not shown in FIG. 8) and optical lens 239 (not shown in FIG. 8) are disposed in association with the predetermined included angle $\theta 1$. Since the predetermined included angle $\theta 1$ is 90 degrees, a theoretical field of view of the first image sensor 232 is indefinite, i.e. a theoretical depth of field of the image acquired by the first image sensor 232 is indefinite. However, an actual depth of field may be determined by the environment and physical limitations of the components themselves. In addition, if the IR light emitted by the IR emitter 238 covers the whole field of view of the first image sensor 232, the object 502 may reflect the IR light for being detected by the first image sensor 232 after entering the illuminated region of the IR light.

Similarly, the second image sensor 242, IR filter 244, optical lens 246, IR emitter 248 and optical lens 249 in the second image sensing assembly 240 may also be arranged similar to FIG. 7. Please refer to FIG. 6 again, in this embodiment the processor 260 is disposed inside the base carrier 210 and electrically coupled to the communication interface 220, the first image sensor 232 and the second image sensor 242. Therefore, when the object 502 is in the touch region 590, the first image sensor 232 and the second image sensor 242 are able to acquire images of the object 502 reflecting the IR light, and then directly transmit acquired image data to the processor 260. Or the first image sensor 232 and the second image sensor 242 may preprocess the acquired image data to retrieve the character information of image (e.g. the parameter of area, length width ratio, boundary, color and/or brightness of the object image) and then transmit preprocessed results to the processor 260 so as to reduce the loading of the processor 260. The processor 260 then calculates a position of the object 502 according to these image data or the character information of image. After obtaining the position of the object 502, the processor 260 transmits information of the position of the object through the communication interface 220 to the portable electronic communication device 100, e.g. a notebook, to allow the electronic device to perform further operations according to the information of the position of the object. A method of obtaining the position information of the object will be further illustrated hereinafter.

A method of obtaining the position information of the object will be further illustrated hereinafter.

Figure 8:
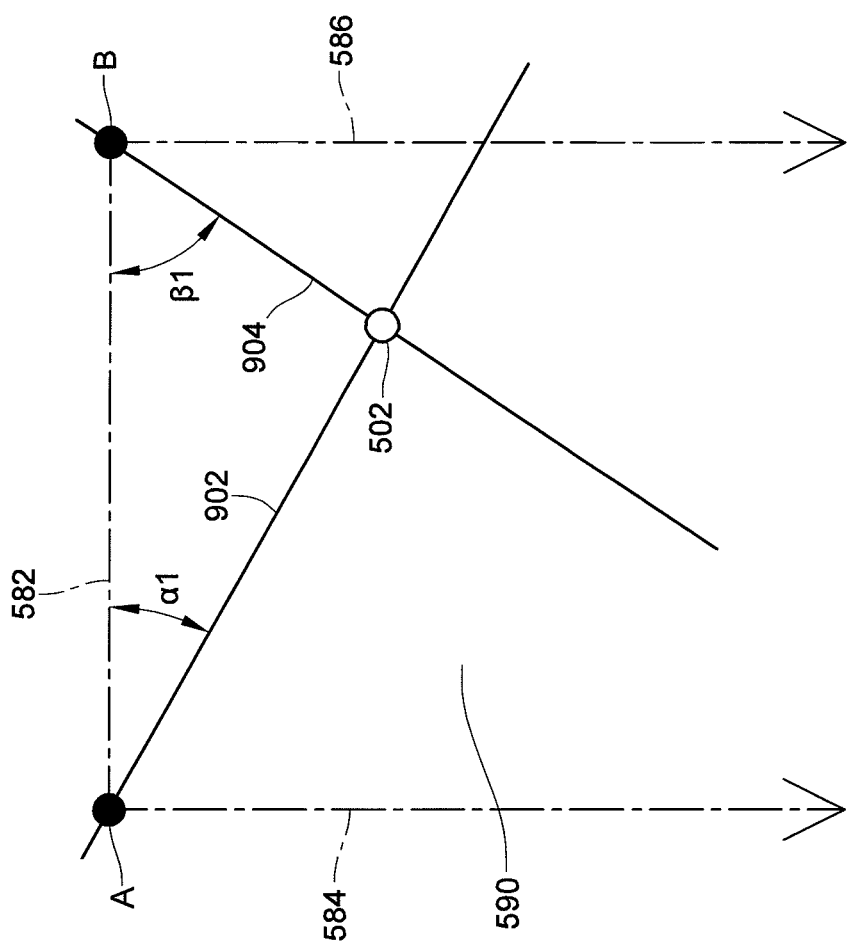
FIG. 8 illustrates the detection of the object position performed by the input device of the disclosure.

In FIG. 8, a point A denotes the disposed position of the first image sensor 232 and a point B denotes the disposed position of the second image sensor 242. As shown in FIG. 8, when the object 502 is in the touch region 590, the first image sensor 232 may detect the object 502 following the route 902 and the second image sensor 242 may detect the object 502 following the route 904. Therefore, as long as the processor 260 is able to obtain linear equations of the routes 902 and 904 respectively according to the images acquired by the first image sensor 232 and the second image sensor 242, a cross point of these two routes may further be calculated so as to obtain the position information of the object 502. The position information herein may be referred as the coordinate of the object 502.

A method of how the processor 260 can obtain the linear equations of these two routes according to the images acquired by the two image sensors will be further illustrated hereinafter.

Figure 9:
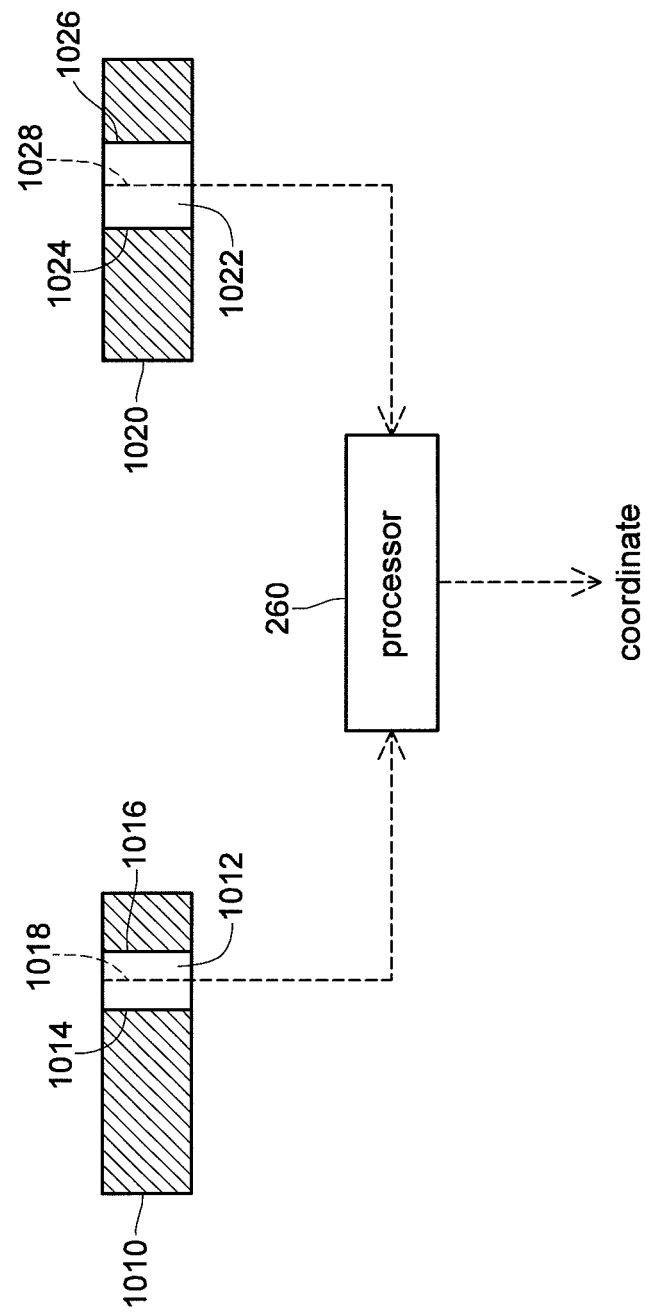
FIG. 9 shows a schematic diagram of the processor receiving and post-processing the image data from the two image sensors.

FIG. 9 shows a schematic diagram of the processor 260 receiving and post-processing the image data from the two image sensors. In FIG. 9, a numerical reference 1010 refers to an image acquired by the first image sensor 232; a numerical reference 1012 refers to a bright zone in the image 1010 formed by sensing the IR light reflected by the object 502 (i.e. the object image); numerical references 1014 and 1016 respectively refer to the left edge and the right edge of the bright zone 1012; and a numerical reference 1018 refers to a center, a gravity center or a mean (or an average) of the bright zone 1012. Numerical references 1014, 1016 and 1018 refer to the character information of the object 502 in the image 1010 herein.

Similarly, a numerical reference 1020 refers to an image acquired by the second image sensor 242; a numerical reference 1022 refers to a bright zone in the image 1020 formed by sensing the IR light reflected by the object 502 (i.e. the object image); numerical references 1024 and 1026 respectively refer to the left edge and the right edge of the bright zone 1022; and a numerical reference 1028 refers to a center, a gravity center or a mean (or an average) of the bright zone 1022. Numerical references 1024, 1026 and 1028 refer to the character information of the object 502 in the image 1020. In addition, other character information of the object 502, such as the parameter of area, length width ratio, boundary, color and/or brightness of the object image may also be processed by the processor 260 or be preprocessed by the first image sensor 234 and the second image sensor 242. In this embodiment, the character information is obtained by the processor 260.

Figure 10:
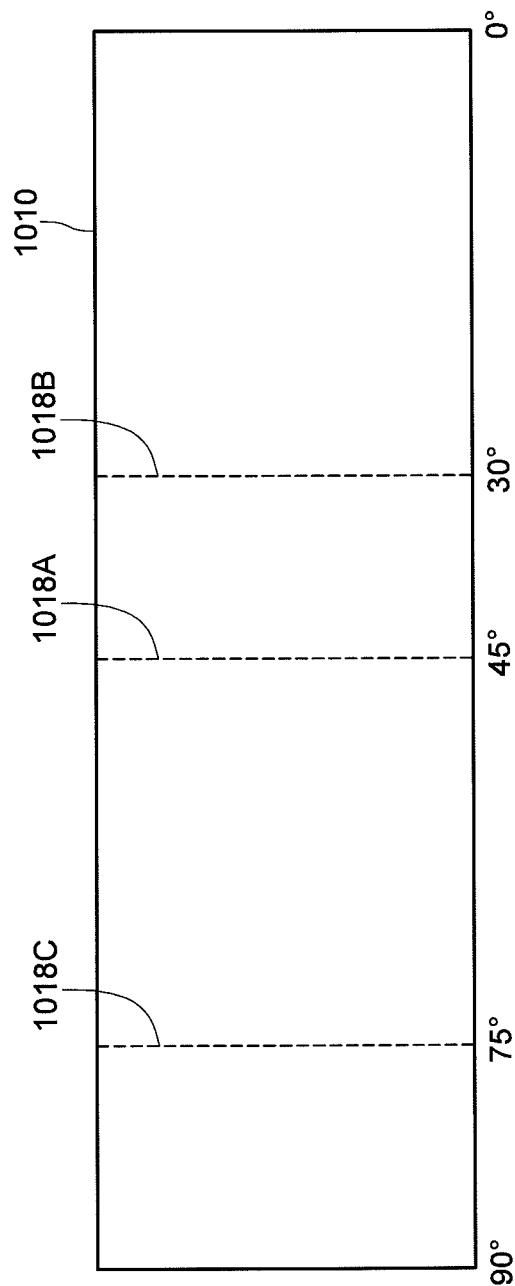
FIG. 10 shows a schematic diagram of corresponding angles relative to object positions in an image acquired by the image sensor.

FIG. 10 shows a schematic diagram of corresponding angles relative to object positions in an image acquired by the first image sensor 232. As mentioned above, after receiving the image 1010, the processor 260 calculates the center, the gravity center or the mean (or average) of the bright zone 1012, i.e. a position of the object 502 in the image 1010. Please refer to FIGS. 8, 9 and 10, in order to obtain the included angle α1 between the dotted line 582 and the route 902, the image 1010 may be averagely divided into a plurality of sections, e.g. 90 sections. Each section may represent 1 degree angle, and the right edge of the image 1010 may be defined as 0 degree and the left edge may be defined as 90 degrees. When the center, the gravity center or the mean (or average) of the object falls within the image 1010, the angle α1 corresponding to the position of the object can be obtained. For example, 1018A represents that the angle α1 is 45 degrees; 1018B represents that the angle α1 is 30 degrees; and 1018C represents that the angle α1 is 75 degrees. If an integral angle can not be obtained, an interpolation can be used to calculate the exact angle. Similarly, the angle β1 can also be obtained by using similar method.

Please refer to FIG. 8, by using the position of point A and the angle α1 which are already known, a linear equation of the route 902 may be obtained by using point-slope form. Similarly, a linear equation of the route 904 may also be obtained according to the position of point B and the angle β1. Therefore, the processor 260 may calculate a cross point of these two routes and further obtain the position of the object 502. This kind of calculation method for the object position is called intersection of two lines. In addition, the portable electrical input device 200 may utilize other methods, e.g. the triangulation, to calculate the position of the object 502 and since this method has been broadly used in conventional optical touch systems, details thereof will not be repeated herein. Furthermore, according to the description above, a person skilled in the art can realize that the portable electrical input device 200 may also be used for multi-touch application.

Furthermore, in addition to the object 502 to be detected, other objects may also exist distantly in the field of views of the first image sensor 234 and the second image sensor 242, and these objects may also reflect IR light to interfere the touch control of the electrical input device 200. The brightness of reflected IR light by an object may be used to identify whether an object image is valid or not. For example, but not limited to, a predetermined brightness threshold or a predetermined brightness range may be preset in the processor 260, and the brightness of every pixel in the image acquired by the first image sensor 234 and the second image sensor 242 may be compared with the predetermined brightness threshold or range. If the brightness of a pixel exceeds the predetermined brightness threshold or falls within the predetermined brightness range, the brightness of this pixel is confirmed to satisfy a predetermined standard. In this way, the brightness of every pixel will be examined sequentially in order to remove other objects and keep the object 502 to be detected.

According to the above description, it is known that a range of the touch region 590 may be indefinite theoretically. However, a size of the touch region 590 may be limited by software. Please refer to FIG. 8 again, in the touch region 590 a length of the side denoted by the dotted line 582 is already known, and lengths of the two sides denoted by the dotted lines 584 and 586 are indefinite theoretically. In order to limit the length of the two sides denoted by the dotted lines 584 and 586 to a predetermined length, the processor 260 may define different touch regions according to different applications. For example, if the electrical input device 200 is served as a virtual mouse, the size of the touch region 590 in front of the image sensing modules 510 and 530 may be defined according to a general size of a physical mouse familiar to a user, e.g. the touch region may have a size of 15 cm.times.15 cm (i.e. a length of dotted line 582.times.a length of dotted line 584). Or the processor 260 may define the predetermined length of the dotted lines 584 and 586 in real time according to a relation between a size and a distance of the object image, or the predetermined length may be defined according to the brightness of reflected light of the object image, or the predetermined length of the dotted lines 584 and 586 may be defined in real time by combining the two methods mentioned above, and the definition method may be built in the software or the firmware adopted in the processor 260. In this manner, the touch region 590 may be a quadrilateral touch region having a predetermined area.

As mentioned above, in the case of the touch region 590 having a predetermined area, the processor 260 may first calculate the position of the object 502 and then identify whether the object 502 is inside the touch region 590. Only if the object 502 is inside the touch region 590, the processor 260 will output information of the position of the object 502 through the communication interface 220. Of course, the processor 260 may also first calculate the position of the object 502 and transmit the calculated information of the position of the object 502 through the communication interface 220 to the electronic device mentioned above to allow the electronic device to identify whether the object 502 is inside the touch region 590 and to determine whether to use the calculated information of the position of the object.

Figure 11:
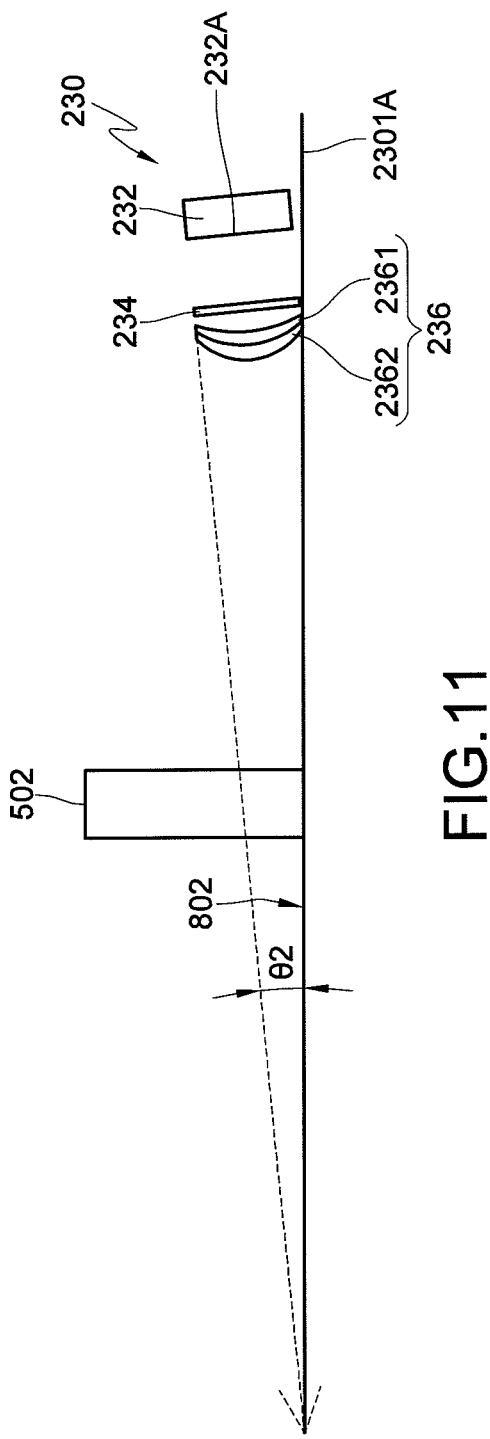
FIG. 11 shows another arrangement of internal components of the image sensing assembly.

This embodiment is mainly used to illustrate that the portable electrical input device 200 may also use the hardware to limit the field of views of the first image sensor 232 and the second image sensor 242 from infinite to finite as shown in FIG. 11. This embodiment calculates the position information of the object illustrated in the embodiment of in FIG. 5. As shown in the figure, FIG. 11 shows another arrangement of internal components of the first image sensing assembly 230. As shown in FIG. 11, there is a predetermined included angle θ3 between the image sensing surface 232A of the first image sensor 232 and the bottom surface 2301A of the base carrier, and the predetermined included angle θ3 is smaller than 90 degrees in this embodiment. In addition, the IR filter 234, optical lens set 236, IR emitter 238 (not shown in FIG. 11) and optical lens 239 (not shown in FIG. 11) are disposed in association with the predetermined included angle θ3; wherein dispositions of the IR emitter 238 and the optical lens 239 have to allow the propagation direction of the IR light to be substantially parallel to the actual working surface 802. As the predetermined included angle θ3 is smaller than 90 degrees, the first image sensor 232 has a limited field of view, i.e. a depth of field of the image acquired by the first image sensor 232 is finite. Similarly, the second image sensor 242, IR filter 244, optical lens 246, IR emitter 248 and optical lens 249 in the second image sensing assembly 240 may also be arranged similar to FIG. 11.

Figure 12:
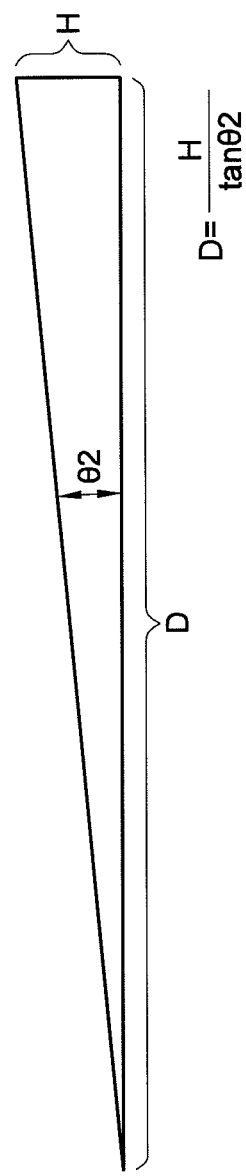
FIG. 12 illustrates the calculation of the farthest field of view detectable by the image sensors.

Please refer to FIG. 8 again, since the field of views of the first image sensor 232 and the second image sensor 242 become limited, in the touch region 590 lengths of the two sides denoted by the dotted lines 584 and 586 may be defined by the farthest field of view detectable by the first image sensor 234 and the second image sensor 242. The farthest field of view detectable by the image sensors may be calculated according to FIG. 12. In FIG. 12, D represents the farthest field of view that the first image sensor 232 can detect (i.e. lengths of the dotted lines 584 and 586), H represents a height of the first image sensor 232, and θ2 represents an angle. A relation between D, H and θ2 may be represented by an equation $D=H/\tan(\theta 2)$ shown in FIG. 11, and a sum of θ3 (refer to FIG. 11) and θ2 equals 90 degrees. For example, when H is 5 mm and θ2 is 1.91 degrees, D can be calculated from the equation $H/\tan(\theta 2)$ to be 150 mm.

In the aforementioned embodiments, the computation of the position information of the object is performed by the processor in the base carrier. In another embodiment, the computation may also be performed by the processor configured in the portable electrical communication device 100. The first image sensing assembly and the second image assembly preprocess the image date to obtain the characteristic data of the image (e.g. the parameter of area, length width ratio, boundary, color and/or brightness of the object image) and then transmit the date to the processor of the portable electrical communication device 100. The portable electrical communication device 100 then calculates the position information of the object 502 according to the image data or the characteristic data of the image.

Accordingly, the disclosure adopts two image sensing assembly and a processor to constitute a portable electrical input device. In the embodiment, the sensing regions of the two sensing assembly overlap with each other to define a touch region. Thus, when an object (such as a finger or a pen-like object) is in the touch region, the process may calculate the position information of the object according to the sensed image detected by the two image sensing assembly. In another embodiment, the two image sensing assembly may also emit IR light or laser light to illuminate the object to obtain the reflected image of the object by the IR light or laser light such that the processor may calculate the position information of the object according to the sensed image.

According to the description of the various embodiments, the disclosed input device may replace current mice, keyboards or touch panels. The disclosed input device has the features of small size or easy carry. The cost of the disclosed input device is also low. The disclosed input device may be also placed everywhere. Further, the disclosed input device does not need to operate on a flat surface, as required for traditional mice. An actual touch region required by the resistance or capacitance touch panels is not necessary. Besides, the base carrier of the disclosed input device may communicate with the portable electrical communication device.

Note that the specifications relating to the above embodiments should be construed as exemplary rather than as limitative of the present invention, with many variations and modifications being readily attainable by a person skilled in the art without departing from the spirit or scope thereof as defined by the appended claims and their legal equivalents.

What is claimed is:

1. A portable electrical input device for docking an electrical communication device, comprising:
   a base carrier used to carry the electrical communication device, the base carrier comprises a vibrating element configured for vibrating in response to a control signal;
   a communication interface configured in the base carrier;
   a first image sensing assembly defining a first sensing region and acquiring a first image;
   a second image sensing assembly defining a second sensing region and acquiring a second image, wherein the first sensing region overlaps the second sensing region to define a touch region;
   an operation sheet having a function pattern, the operation sheet being configured in the touch region; and
   a processor electrically connected to the first image sensing assembly, the second image sensing assembly and the communication interface, which operates on the function pattern of the operation sheet in response to an object, sensed by the first image sensing assembly and the second image sensing assembly, whereby position information of the object in the touch region is obtained by the computation performed by the processor and is sent to the electrical communication device through the communication interface, wherein the processor presets a predetermined brightness threshold or a predetermined brightness range and compares the predetermined brightness threshold or the predetermined brightness range with a brightness of every pixel in the first and second images acquired by the first image sensing assembly and the second image sensing assembly, and the predetermined brightness threshold or the predetermined brightness range is used for removing other objects from the first and second images and keeping the sensed object, wherein the pixel in the first and second images is kept if brightness of the pixel exceeds the predetermined brightness threshold or falls within the predetermined brightness range;

wherein the control signal is generated by the processor after the position information is obtained by the computation performed by the processor.

2. The portable electrical input device of claim 1, further comprising a sounding element to sound in response to the control signal.

3. The portable electrical input device of claim 1, wherein a determination signal is generated by the processor in response to the object sensed by the first image sensing assembly and the second image sensing assembly, wherein when the determination signal indicates the object is in the touch region, the processor generates the control signal.

4. A portable electrical input device for docking an electrical communication device, comprising:

a base carrier used to carry the electrical communication device, the base carrier comprises a vibrating element configured for vibrating in response to a control signal;

a communication interface configured in the base carrier;

a first image sensing assembly defining a first sensing region and acquiring a first image;

a second image sensing assembly defining a second sensing region and acquiring a second image, wherein the first sensing region overlaps the second sensing region to define a touch region;

a light emitting device configured in the base carrier, projecting a function pattern on a working plane corresponding to the touch region; and a processor electrically connected to the first image sensing assembly, the second image sensing assembly and the communication interface, which operates on the function pattern projected on the working plane in response to an object, sensed by the first image sensing assembly and the second image sensing assembly, whereby position information of the object in the touch region is obtained by the computation performed by the processor and is sent to the electrical communication device through the communication interface, wherein the processor presets a predetermined brightness threshold or a predetermined brightness range and compares the predetermined brightness threshold or the predetermined brightness range with a brightness of every pixel in the first and second images acquired by the first image sensing assembly and the second image sensing assembly, and the predetermined brightness threshold or the predetermined brightness range is used for removing other objects from the first and second images and keeping the sensed object, wherein the pixel in the first and second images is kept if brightness of the pixel exceeds the predetermined brightness threshold or falls within the predetermined brightness range;

wherein the control signal is generated by the processor after the position information is obtained by the computation performed by the processor.

5. The portable electrical input device of claim 4, further comprising an operation sheet on the working plane, for the function pattern being projected thereon.

6. The portable electrical input device of claim 4, further comprising a sounding element to sound in response to the control signal.

7. The portable electrical input device of claim 4, wherein a determination signal is generated by the processor in response to the object sensed by the first image sensing assembly and the second image sensing assembly, wherein when the determination signal indicates the object is in the touch region, the processor generates the control signal.

8. A portable communication electrical system, comprising:

a base carrier, the base carrier comprises a vibrating element configured for vibrating in response to a control signal;

a communication interface configured in the base carrier;

an operation sheet having a function pattern; and a portable communication electrical device, which is optionally carried by the base carrier, comprising:

a first image sensing assembly defining a first sensing region and acquiring a first image;

a second image sensing assembly defining a second sensing region and acquiring a second image, wherein the first sensing region overlaps the second sensing region to define a touch region, for the operation sheet being arranged therein; and a processor electrically connected to the first image sensing assembly, the second image sensing assembly and the communication interface, which operates on the function pattern of the operation sheet in response to an object, sensed by the first image sensing assembly and the second image sensing assembly, whereby position information of the object in the touch region is obtained by the computation performed by the processor and is sent to the electrical communication device through the communication interface, wherein the processor presets a predetermined brightness threshold or a predetermined brightness range and compares the predetermined brightness threshold or the predetermined brightness range with a brightness of every pixel in the first and second images acquired by the first image sensing assembly and the second image sensing assembly, and the predetermined brightness threshold or the predetermined brightness range is used for removing other objects from the first and second images and keeping the sensed object, wherein the pixel in the first and second images is kept if brightness of the pixel exceeds the predetermined brightness threshold or falls within the predetermined brightness range;

wherein the control signal is generated by the processor after the position information is obtained by the computation performed by the processor.

9. The portable communication electrical system of claim 8, further comprising a sounding element to sound in response to the control signal.

10. The portable communication electrical system of claim 8, wherein a determination signal is generated by the processor in response to the object sensed by the first image sensing assembly and the second image sensing assembly, wherein when the determination signal indicates the object is in the touch region, the processor generates the control signal.

11. A portable communication electrical system, comprising:

a base carrier, the base carrier comprises a vibrating element configured for vibrating in response to a control signal;

a communication interface configured in the base carrier;

a light emitting device configured in the base carrier, projecting a function pattern on a working plane corresponding to a touch region; and a portable communication electrical device, which is optionally carried by the base carrier, comprising:

a first image sensing assembly defining a first sensing region and acquiring a first image;

a second image sensing assembly defining a second sensing region and acquiring a second image, wherein the first sensing region overlaps the second sensing region to define a touch region, for the function pattern being arranged therein; and a processor electrically connected to the first image sensing assembly, the second image sensing assembly and the communication interface, which operates on the function pattern projected on the working plane in response to an object, sensed by the first image sensing assembly and the second image sensing assembly, whereby position information of the object in the touch region is obtained by the computation performed by the processor and is sent to the electrical communication device through the communication interface, wherein the processor presets a predetermined brightness threshold or a predetermined brightness range and compares the predetermined brightness threshold or the predetermined brightness range with a brightness of every pixel in the first and second images acquired by the first image sensing assembly and the second image sensing assembly, and the predetermined brightness threshold or the predetermined brightness range is used for removing other objects from the first and second images and keeping the sensed object, wherein the pixel in the first and second images is kept if brightness of the pixel exceeds the predetermined brightness threshold or falls within the predetermined brightness range;

wherein the control signal is generated by the processor after the position information is obtained by the computation performed by the processor.

12. The portable communication electrical system of claim 11, further comprising an operation sheet on the working plane, for the function pattern being projected thereon.

13. The portable communication electrical system of claim 11, further comprising a sounding element to sound in response to the control signal.

14. The portable communication electrical system of claim 11, wherein a determination signal is generated by the processor in response to the object sensed by the first image sensing assembly and the second image sensing assembly, wherein when the determination signal indicates the object is in the touch region, the processor generates the control signal.

* * * * *